No. 676,236. Patented June 11, 1901.
R. M. JOHNSON.
WICK TRIMMER.
(Application filed Sept. 1, 1900.)
(No Model.)
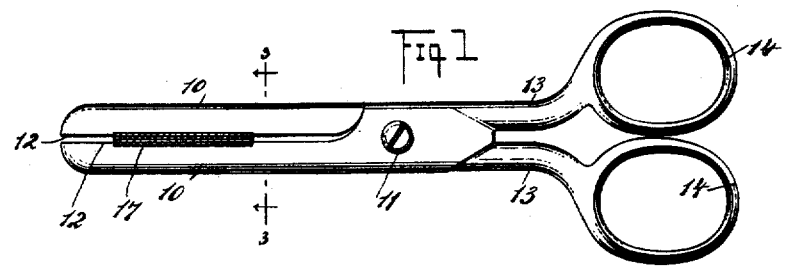
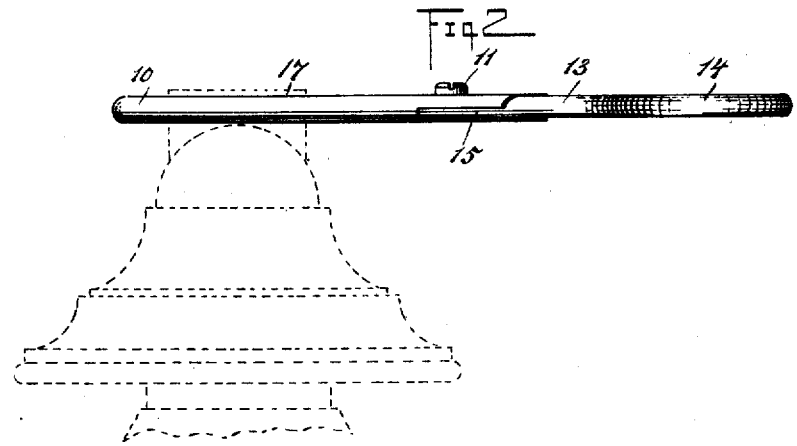
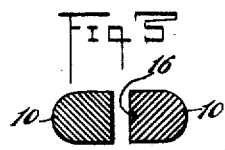
WITNESSES:
INVENTOR
Robert M. Johnson.
BY
ATTORNEYS

UNITED STATES PATENT OFFICE.

ROBERT M. JOHNSON, OF LANCASTER, PENNSYLVANIA.

WICK-TRIMMER.

SPECIFICATION forming part of Letters Patent No. 676,236, dated June 11, 1901.

Application filed September 1, 1900. Serial No. 28,765. (No model.)

*To all whom it may concern:*

Be it known that I, ROBERT M. JOHNSON, a citizen of the United States, and a resident of Lancaster, in the county of Lancaster and State of Pennsylvania, have invented certain new and useful Improvements in Wick-Trimmers, of which the following is a full, clear, and exact description.

The purpose of the invention is to provide a simple device which will serve to clamp a wick to be trimmed and by means of which the wick will not only be compressed at its exposed or igniting surface, but whereby also a straight horizontal line may be established at the charred portion of the wick and a substantial surface obtained at each side of the wick, upon which surfaces the shears or scissors employed for cutting the wick may bear or over which surfaces the wiping material for the wick may be drawn.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved device, showing said device applied to a wick. Fig. 2 is an edge view of the device, a wick and burner being shown in connection therewith in dotted lines; and Fig. 3 is a transverse section taken practically on the line 3 3 of Fig. 1.

Two blades or jaws 10 are employed, which blades or jaws when closed are in parallelism, and said blades or jaws at their rear portions cross one another and are pivotally connected by a suitable pin 11 in similar manner to the blades of a pair of shears. At the rear of the pivot 11 each blade or jaw 10 is provided with a shank 13, and each shank is usually connected with a loop 14, through which, respectively, the thumb and a finger of the hand may be passed for the purpose of manipulating the jaws or blades.

The opposing faces 12 of the jaws or blades 10 are flat, being at right angles to the plane of the jaws or blades, so that when the jaws or blades are brought together the opposing flat faces 10 will engage each other throughout the thickness of the blades or jaws and the said jaws or blades will present flat upper and lower surfaces. If desired, at a point in the flat clamping-surface of one or both of the jaws 12 a longitudinal groove 16 may be produced, as shown in Fig. 3, so that when a wick 17 is clamped or compressed between the jaws or blades 10 portions of the wick will enter the groove or grooves 16, and thus prevent the device from slipping; but preferably in the use of the device when a wick is to be clamped the jaws or blades 10 are made to rest upon the upper surface of the wick-tube, so that said jaws or blades will lie in a horizontal plane; but, if desired, as shown in Fig. 2, the cap of the burner need not be removed and the jaws or blades may rest upon the crown of the burner-cap, the wick having been turned up sufficiently, so that it may be grasped between the said blades or jaws.

The opposing faces of the portions of the jaws or blades 10 at which the pivot 11 is located are recessed to produce depressions 15, so that one section of the device at the pivot may fit close to the opposing section and the side faces of the device be rendered substantially in the same plane. Thus it will be observed that when a wick 17 is held between the blades or jaws 10 of the device the wick is compressed and rendered solid at its burning-surface or point of ignition, at which point the device is to engage with the wick, and in engaging the device with the wick the upper surface of the device is designedly brought just below the whole of the charred line of the wick, so that the charred portion of the wick above the jaws or blades may be wiped off and the surface of the wick to be ignited left perfectly straight and practically without any spurs, so that the flame will not only be broad, but will be compact, the upper surface of the device serving as a bearing or guide for the wiping material; but should scissors or shears be employed to remove the charred surface of the wick or trim the same the upper surface of the device serves as a guide and bearing for the scissors or shears, insuring a straight and horizontal cut.

Having thus described my invention, I claim as new and desire to secure by Letters Patent—

1. A device for trimming wicks, comprising two jaws pivotally connected together, the opposing faces of the jaws being flat so as to engage each other throughout the thickness of the said jaws and when so engaged presenting a flat upper face, substantially as and for the purpose set forth.

2. A device for trimming wicks, comprising two jaws pivoted together and provided with shanks terminating in loops, the opposing faces of the jaws being approximately at right angles to the plane of the jaws, the said jaws when closed engaging each other at their upper edges and presenting a flat upper face, substantially as and for the purpose specified.

3. A device for trimming wicks, consisting of two jaws pivoted together, each jaw having a flat clamping-surface which extends throughout the thickness of the jaw, the clamping-surface of one jaw being provided with a longitudinal groove, substantially as described.

In testimony whereof I have signed my name to this specification in the presence of two subscribing witnesses.

ROBERT M. JOHNSON.

Witnesses:
WM. H. GEST,
GEORGE SHIFFNER.